April 19, 1955 C. ABEL 2,706,358

TROUT FISHERMAN'S LINE DISPENSER

Filed Jan. 23, 1950

WITNESSES

INVENTOR
Clarence Abel

United States Patent Office 2,706,358
Patented Apr. 19, 1955

2,706,358

TROUT FISHERMAN'S LINE DISPENSER

Clarence Abel, Toledo, Ohio

Application January 23, 1950, Serial No. 140,050

5 Claims. (Cl. 43—19.2)

It is well known among trout fishermen that in order to successfully catch trout it is necessary to present the bait to the fish in a natural manner, and that there must be no drag on the fish line due to the inability of the fisherman to achieve a free flow of line into the water. Also difficulty is often encountered in projecting line into a stream from a brushy bank, without creating a commotion that will alarm the fish. This invention relates to a device for use on an ordinary fish rod with the principal object of providing a simple and efficient means for dispensing the fish line through the tip of the said fish rod.

I attain this object by mechanism illustrated in the accompanying drawing, in which—

Figure 2:
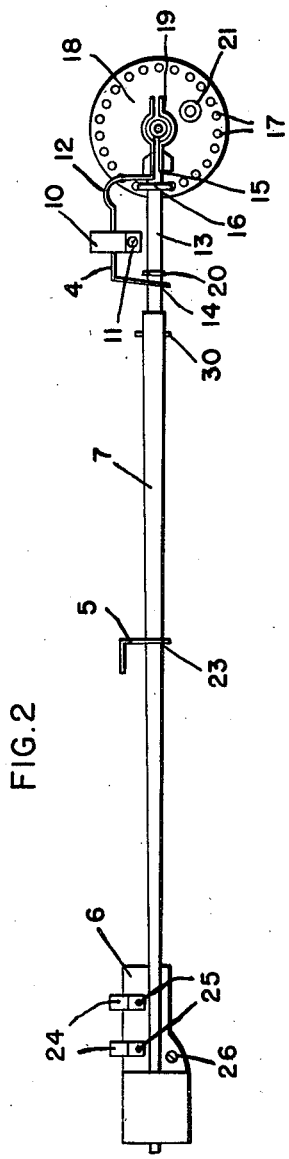
Figure 1:
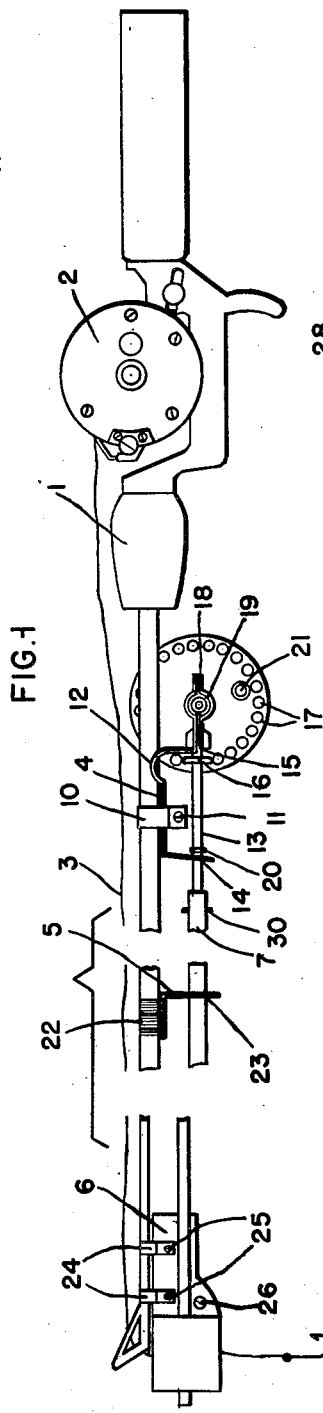
Figure 3:
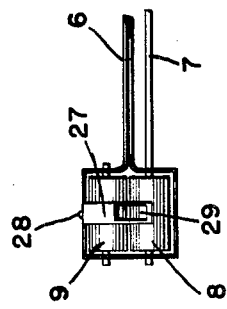
Figure 4:
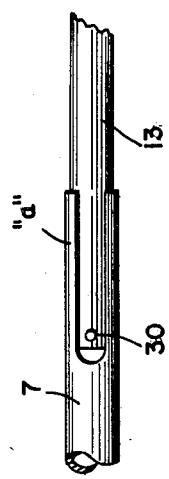

Figure 1 is a view of an ordinary fish rod, reel, and line, showing the application of my device thereto; Fig. 2, a similar view of my invention disconnected from the fish rod; Fig. 3, a top plan view of the rod tip mechanism hereinafter referred to as the hanger 6; and Fig. 4 is a detailed plan view of the pin and slot connection of the device of my invention shown in Fig. 1.

Referring more in detail to the parts, 1 represents a fish rod of any ordinary construction, 2 a casting reel of any style or type, and 3 an ordinary fish line.

In the hangers 5 and 6, mounted on the underside of the fish rod 1, turns a pipe 7, to which is affixed a rubber roller 8 in the said hanger 6. The said roller 8 actuates by friction a rubber roller 9, causing the fish line 3, which passes between the said rollers 8 and 9, to be pulled from the reel 2 through the fish rod tip when the said pipe 7 is rotated in a clockwise motion.

The hanger 4 is secured to the underside of the fish rod 1 by a clamp 10 and a bolt 11, and is held in alignment by a saddle 12 in which rests the said fish rod 1. A shaft 13 enters the said hanger 4 through the aperture 14, and ends in the recess 15 in the said hanger 4. The said shaft 13 is driven by a cog-wheel 16 affixed to the said shaft 13. The said cog-wheel 16 gears into the perforations 17, in a disk 18, mounted on the said hanger 4 on an axle 19, and is held in alignment with the said perforations 17 by a collar 20, affixed to the said shaft 13. A peg 21 is inserted through the said disk 18, to which a knob (not shown) is mounted on the opposite side of the said disk 18 to grasp for actuating the mechanism.

The hanger 5 is secured to the underside of the fish rod 1, approximately midway from the base to the tip, by thread windings 22, and is provided with an aperture 23, through which passes the pipe 7, so that the said pipe 7 is held in alignment with the said fish rod 1.

The hanger 6 is secured to the underside of the fish rod 1 by the clamps 24, 24, and the bolts 25, 25. A bolt 26 is passed through the said hanger 6 to provide rigidity. The said hanger 6 may be constructed of one continuous piece of material, as shown in Fig. 3, properly bent to provide a frame for the rubber rollers 8 and 9. A plate 27 is secured to the side of the said hanger 6, by a bolt 28, and is bent at a right angle at the top edge of the said hanger 6. Said plate 27 has an orifice 29 to serve as a guide to the fish line 3. A plate similar to the said plate 27 is also secured by said bolt 28 and is bent at a right angle at the bottom edge of the said hanger 6 (not shown).

The pipe 7 is slidably mounted on the shaft 13, and is slotted to take a pin 30 which pierces and is affixed to the said shaft 13. Thus, it will be understood that when the fish rod 1 is flexed, as in playing a fish that has been caught, end play will be provided for in the combined structure of the said pipe 7 and the said shaft 13.

I claim:

1. The combination with a fish rod having a handle and a tip, of a revolvable pipe or shaft, slidably adjustable in length, said pipe having hangers or brackets to engage said rod to maintain said pipe or shaft in the same plane with said fish rod, gears adjacent said handle to revolve said pipe or shaft, and a pair of revolvable rollers or spools remote from said handle and rotatable by said pipe or shaft; whereby fish line may be pulled through the said tip of the said fish rod in the quantity desired by the fisherman.

2. The combination with a fish rod, having a handle, a tip, a reel, a line fed off of said reel, and guides to receive said line, of a revolvable pipe or shaft, said pipe or shaft having hangers or brackets to engage said fish rod, means adjacent said handle to revolve said pipe or shaft, and a pair of revolvable rollers or spools adjacent said tip and rotatable by said pipe or shaft; whereby said line may be dispensed through said tip at the will of the operator.

3. The combination with a fish rod, having a handle and a tip, and equipped with a reel, a line fed off of said reel, guides to receive said line, a fish hook or hooks attached to the end of said line remote from said reel, and artificial or natural bait affixed to or made a part of said fish hook or hooks, of a revolvable pipe or shaft, slidably adjustable in length, said pipe or shaft having hangers or brackets to engage said fish rod to maintain said pipe or shaft in the same plane with said fish rod, means adjacent said reel to revolve said pipe or shaft, and means adjacent said tip whereby said line may be pulled from said reel through said guides and through said tip as required to present said artificial or natural bait in or upon the water in a natural manner.

4. The combination of a fishing pole having a handle and a reel adjacent one end thereof, said reel being provided with a line, and a tip adjacent the other end through which said line passes, with means for engaging said line after it has passed through said tip for drawing the desired additional length of line from said reel and through said tip, said means comprising a manually rotatable member secured to said fishing pole adjacent said handle, rotatable line-engaging means secured to said fishing pole adjacent said tip, and means connecting said manually rotatable means to said rotatable line-engaging means, whereby rotation of the former in one direction will cause rotation of the latter in the direction to draw additional lengths of line through said tip.

5. A device as set forth in claim 4 in which the means for connecting the manually rotatable means to the rotatable line-engaging means is slidably adjustable in length.

References Cited in the file of this patent

UNITED STATES PATENTS

| | | |
|---|---|---|
| 2,145,966 | Bedell | Feb. 7, 1939 |
| 2,279,853 | White | Apr. 14, 1942 |

FOREIGN PATENTS

| | | |
|---|---|---|
| 436,833 | Great Britain | 1935 |